(12) United States Patent
Hamlyn

(10) Patent No.: US 10,207,465 B2
(45) Date of Patent: *Feb. 19, 2019

(54) FIBER APPLICATION MACHINE WITH SAFETY SYSTEM

(71) Applicant: Coriolis Group, Lyons (FR)

(72) Inventor: Alexander Hamlyn, Ploemeur (FR)

(73) Assignee: Coriolis Group, Queven (FR)

(*) Notice: Subject to any disclaimer, the term of this patent is extended or adjusted under 35 U.S.C. 154(b) by 81 days.

This patent is subject to a terminal disclaimer.

(21) Appl. No.: 15/216,836

(22) Filed: Jul. 22, 2016

(65) Prior Publication Data

US 2016/0325508 A1 Nov. 10, 2016

Related U.S. Application Data

(63) Continuation of application No. 14/006,064, filed as application No. PCT/EP2012/054621 on Mar. 15, 2012, now Pat. No. 9,409,350.

(30) Foreign Application Priority Data

Mar. 18, 2011 (FR) ..................................... 11 52268

(51) Int. Cl.
B29C 70/38 (2006.01)

(52) U.S. Cl.
CPC .......... B29C 70/384 (2013.01); B29C 70/382 (2013.01); *Y10T 156/17* (2015.01)

(58) Field of Classification Search
CPC ......................... B29C 70/382; B29C 70/384
See application file for complete search history.

(56) References Cited

U.S. PATENT DOCUMENTS

| 5,645,677 A | 7/1997 | Cahuzac et al. |
| 7,632,372 B2 | 12/2009 | Hoffmann et al. |
| 7,819,160 B2 | 10/2010 | Hamlyn et al. |
| 7,926,537 B2 | 4/2011 | Hamlyn et al. |
| 8,052,819 B2 | 11/2011 | Munaux et al. |
| 8,057,618 B2 | 11/2011 | Hamlyn |
| 8,191,596 B2 | 6/2012 | Hamlyn et al. |
| 9,409,350 B2 * | 8/2016 | Hamlyn ............... B29C 70/382 |
| 2002/0090408 A1 | 7/2002 | Dahl et al. |

(Continued)

FOREIGN PATENT DOCUMENTS

| FR | 2 882 681 A1 | 9/2006 |
| FR | 2 937 582 A1 | 4/2010 |

(Continued)

OTHER PUBLICATIONS

Application and File history for U.S. Appl. No. 14/006,064, filed Nov. 18, 2013. Inventor: Hamlyn et al.

*Primary Examiner* — Jeffry H Aftergut
(74) *Attorney, Agent, or Firm* — Patterson Thuente Pedersen, P.A.

(57) ABSTRACT

A fiber application machine comprising a fiber application head, a displacing system to displace said fiber application head, fiber storage, and a fiber conveyor to convey the fibers from the fiber storage to the application head. The machine further comprises a safety system comprising at least one perimeter barrier defining a safety zone wherein the displacing system carrying the application head is placed, the fiber storage being arranged outside of said safety zone.

15 Claims, 7 Drawing Sheets

(56) References Cited

U.S. PATENT DOCUMENTS

| | | |
|---|---|---|
| 2008/0020691 A1 | 1/2008 | Kuebler |
| 2008/0196825 A1 | 8/2008 | Hamlyn et al. |
| 2008/0202691 A1 | 8/2008 | Hamlyn et al. |
| 2008/0216961 A1 | 9/2008 | Hamlyn et al. |
| 2008/0216963 A1 | 9/2008 | Hamlyn et al. |
| 2009/0095410 A1 | 4/2009 | Oldani |
| 2009/0229760 A1* | 9/2009 | Hamlyn ................ B29C 70/384 156/433 |
| 2010/0252183 A1 | 10/2010 | Munaux et al. |
| 2011/0011537 A1 | 1/2011 | Hamlyn et al. |
| 2011/0011538 A1 | 1/2011 | Hamlyn et al. |
| 2011/0272126 A1 | 11/2011 | Hamlyn et al. |

FOREIGN PATENT DOCUMENTS

| | | |
|---|---|---|
| WO | WO 2006/092514 A2 | 9/2006 |
| WO | WO 2010/049424 A1 | 5/2010 |

\* cited by examiner

FIBER APPLICATION MACHINE WITH SAFETY SYSTEM

RELATED APPLICATIONS

This application is a continuation of application Ser. No. 14/006,064 filed Nov. 18, 2013, which is a National Phase entry of PCT Application No. PCT/EP2012/054621 filed Mar. 15, 2012, which claims priority from FR Patent Application No. 1152268, filed Mar. 18, 2011, each of which is hereby fully incorporated herein by reference.

TECHNICAL FIELD

This invention relates to a fiber application machine for the production of composite material parts, and more particularly a fiber application machine with a safety system.

BACKGROUND

Fiber application machines, commonly referred to as fiber placement machines, are known for the application on a draping tool, such as a male or female mold, of a wide strip formed of several ribbon-type dry or resin impregnated flat fibers, in particular carbon fibers, comprised of a multitude of carbon threads or filaments, dry or impregnated with a thermosetting or thermoplastic resin.

Fiber application machines are used to produce preforms formed from several superposed plies, with each ply formed by draping on the mold of one or several joining strips. In the case of a draping of fibers pre-impregnated with resin, the preform, referred to as preimpregnated, is hardened or polymerized by passing through an oven to obtain a composite material part. In the case of so-called dry fibers, fiber that are not preimpregnated with resins, but possibly comprising a very reduced quantity of resin, referred to as a binder resin, to confer a sticky nature to the fibers during the draping, resin is injected or infused into the dry preform before the step of hardening.

These machines, such as described in patent document WO2006/092514, conventionally include a fiber application head, a system for displacing said fiber application head, fiber storing means, and fiber conveying means to convey the fibers from said fiber storing means to the application head.

The fiber application head, also called fiber placement head, conventionally comprises an application roller intended to come into contact against the mold to apply the strip, and means for guiding fibers onto said application roller. The head generally further comprises a heating system to heat the fibers. The compaction roller presses the strip of fibers against the application surface of the mold, or against the strip or strips of fibers previously deposited, in order to facilitate the adherence of the deposited strips between them, as well as to progressively remove the air imprisoned between the deposited strips. The heating system provides heating of the strip of fibers, and/or of the mold or of the strips already applied upstream of the compaction roller, just before the compaction of the strip, in order to at least soften the pre-impregnation resin or the binder resin, and as such favor the strips adhering together.

The displacing system provides for the displacement of the application head according to at least three directions perpendicular to one another. The displacing system may be formed by a standard six-axis robot type poly-articulated arm, arranged on the ground or mounted on a linear axis, with an end wrist to which the application head is fixed, or by a gantry-type Cartesian-coordinate robot provided with an end wrist carrying the application head.

In the case of fibers packaged in the form of spools, the fiber storing means conventionally comprise a creel or spool cabinet. The creel can be arranged on the ground in the vicinity of the application head, for example in the case of a fixed standard robot, or can be mounted on a member of the displacing system, for example on one of the carriages of the Cartesian-coordinate robot or on a follower-carriage sliding on the linear axis of the standard robot.

Such as described in the aforementioned patent document, the conveying means are advantageously formed of flexible tubes connecting the storing means to the application head, each flexible tube being able to receive a fiber in its internal passage. The flexible tubes can be placed in a sheath, such as described in patent document WO2010/049424.

For the safety of the operators, the machine is placed in a so-called safety zone, defined by a safety system, for example a perimeter safety system, such as a wire mesh lateral barrier surrounding the machine, in such a way that an operator cannot be present in the safety zone during the automatic operation of the machine, in particular during the automatic displacement of the head by the displacing system.

The operator cannot access the machine, in particular the head and/or the creel, without stopping the machine to carry out maintenance and/or verification operations, or without switching to a manual mode with limited speed. These interruptions substantially increase the production time of the parts, and therefore the effectiveness of the machine. In the case of a large-size machine, the access time to the machine for the operator can be substantial. Moreover, the safety system must have a dimension that is sufficiently large to integrate the entire machine, and represents a substantial cost.

What is needed is a machine that overcomes the aforementioned disadvantages, that is effective while still guaranteeing good safety conditions for the operators.

SUMMARY

The present invention overcomes the aforementioned disadvantages by a fiber application machine comprising
a fiber application head preferably comprising an application roller and means for guiding fibers on said application roller,
a displacing system to displace said fiber application head,
fiber storing means, and
fiber conveying means to convey the fibers from said storing means to the application head. The fiber application machine further includes a safety system comprising at least one perimeter barrier defining a safety zone wherein is placed the displacing system carrying the application head, the storing means being arranged outside of said safety zone, the conveying means passing through or circumventing above or below said perimeter barrier.

According to an embodiment of the invention, the storing means, preferably formed of a creel or spool cabinet, are placed outside of the safety zone, with the perimeter barrier surrounding the displacing system provided with the head, as well as a possible draping tool.

The encumbrance of on-board creels on one of the members of the displacing system or arranged in the vicinity of the application head imposes having rail over-lengths or a dedicated space in the safety zone. In an embodiment, positioning of the creel outside of the safety system makes it possible to reduce the dimensions of the safety system and/or of the displacing system, and as such substantially reduce the cost of the machine.

In an embodiment, storing means can be placed outside of the safety zone while still forming a portion of the perimeter barrier. In an embodiment where the storing means comprises a creel, one or several walls of the creel can form a portion of the perimeter barrier, and the spools are accessible from the outside of the safety zone via a door of the creel.

In an embodiment of a machine provided with a heating system that implements a laser, the machine comprises a safety system which constitutes a protective enclosure forming a screen to the radiation emitted by the laser. Such enclosures are particularly costly, and reducing their dimension makes it possible to lower their cost. In an embodiment, the enclosures forming a screen to the laser radiation are opaque, allowing the operator to verify the proper operation of the creel placed outside of the enclosure during draping in automatic mode.

In an embodiment, the operator can freely and quickly access the creel, to replace the spools, for example, without stopping the machine or without switching to a "manual" mode with limited speed, which greatly optimizes the production time of the parts. According to an embodiment, said safety system comprises a perimeter barrier formed from a solid lateral wall, the lateral wall being provided with means for accessing the protective zone.

According to an embodiment, said safety system forms a protective enclosure comprising said lateral wall and an upper wall, with the fibers passing through an opening of a wall of the enclosure. Said conveying means are able to convey the fibers from the storing means to the application head by passing said fibers through an opening of one of the walls of the enclosure, said conveying means passing through an opening of one of the walls of the enclosure.

According to another embodiment, the protection system comprises solely a perimeter barrier, such as a physical barrier, for example a wire mesh barrier, or an immaterial barrier, such as an optical barrier, to prevent any impact or contact of the displacing system or of the head with an operator, the conveying means can pass through an opening or passage of the barrier, or above or below the perimeter barrier.

In an embodiment, heating during the application of the strip can be carried out by a heating system of the laser type to obtain a precise and concentrated heating, in particular in the case of thermoplastic resins, where the pre-impregnated fibers must be heated to higher temperatures, at least to the fusion temperature of the resin, which is approximately 200° C. for nylon-type resins, and to approximately 400° C. for PEEK-type resins. According to an embodiment, said fiber application head comprises a heating system of the laser type, said protective enclosure forming a screen to the radiation emitted by the heating system, with the fibers passing through an opening of a wall of the enclosure in a substantially light radiation-tight manner, said conveying means passing through said opening in a substantially light radiation-tight manner. The conveying means are able to convey the fibers from the storing means to the application head by passing said fibers through an opening of a wall of the enclosure in a substantially light radiation-tight manner. The creel can be positioned at a distance from the protective enclosure, said conveying means passing through said opening in a substantially light radiation-tight manner. The creel can be positioned against said protective enclosure or in the immediate vicinity of the latter, or one or several walls of the creel can constitute a portion of the protective enclosure, one of said walls of the creel then comprising said opening for the passing of fibers in a substantially light radiation-tight manner.

According to an embodiment, the storing means rest in a fixed manner on the ground, during draping operations, said storing means comprising a creel for receiving fiber spools; integrated into a cabinet. According to an embodiment, said fiber conveying means comprise flexible tubes, each flexible tube being able to receive a fiber in its internal passage. The light tightness at the level of the flexible tubes can be guaranteed by the length and the geometry of the flexible tubes.

According to an embodiment, each tube comprises at least one tube segment extending in the safety zone and connected at the safety system to a fixing system, in particular at the lateral wall of the enclosure, for example in the form of one or several ramps, said safety system being provided with a tightness system, guaranteeing a tightness between the internal passages of said segments and the outside of the safety system, said system guaranteeing a light tightness and/or a gas tightness.

According to an embodiment, each tube comprises a first tube segment extending from the storing means to the safety system and a second tube segment extending from the safety system to the fiber application head, the first segments and the second segments being connected at said safety system to a fixing system, in particular at the lateral wall of the enclosure, for example in the form of one or several ramps. Such tube segments allow for easy installation and replacing of the tubes.

In an embodiment, said fixing system is provided with a tightness system, guaranteeing tightness between the internal passages of the first tube segments and the internal passages of the second tube segments, said system guaranteeing a light tightness and/or gas tightness.

According to another embodiment, the creel is positioned against said protective enclosure or in the immediate vicinity of the latter, or at least one wall of the creel constitutes a portion of the safety system, each tube extending from the safety system to the fiber application head, in one or several segments, the tubes being connected at the level of said safety system to a fixing system, in particular at the lateral wall of the enclosure, for example in the form of one or several ramps. In an embodiment, said fixing system is provided with a tightness system, guaranteeing tightness between the internal passages of the tubes and the outside of the safety system.

In an embodiment where the creel is positioned against said protective enclosure or in the immediate vicinity of the latter, the system for fixing the tubes is, for example, mounted at the level of an opening of the enclosure, with the fibers exiting by an opening of the creel which is arranged across from the fixing system. In an embodiment where a wall of the creel constitutes a portion of the protective enclosure, the fixing system is, for example, mounted on an opening of said wall of the creel.

According to an embodiment, the fiber conveying means, in particular said flexible tubes, are placed in the internal passage of at least one flexible tubular sheath, said machine further comprising cooling means able to inject a cold gas in said internal passage of said sheath called the cold sheath, to cool and maintain the fibers at a low temperature, at which the fibers remain not very sticky.

In an embodiment, said sheath is assembled by its upstream end and its downstream end, respectively to the storing means and to the application head, respectively by upstream and downstream fixing means, with said sheath having sufficient length and flexibility so as not to limit the movements of the system for displacing the head. Said means for injecting cold gas are able to inject a cold gas in the internal passage of said sheath via the upstream end of said sheath, said injecting means creating in the sheath a stream of cold gas oriented towards the application head, exiting via said open downstream end. The machine comprises one or several cold sheaths. According to an embodiment, the fiber application machine comprises a single sheath, with the flexible tubes gathered together within said sheath.

In an embodiment, the machine comprises a slack recovery system, acting on the downstream portion of the sheath placed in the protective zone, in such a way that at least the downstream portion of the sheath remains substantially taut, regardless of the position of the head. According to an embodiment, said slack recovery system comprises elastic return means elastically connecting a point of the sheath to a point of the machine, which is for example fixed with respect to the base of the poly-articulated arm. Said connecting means comprise for example at least one automatic cable winder, for example a spring-type cable winder, with one of the members among the winder and the free end of its cable being connected to said point of the machine, with the other member fixed to the sheath.

According to an embodiment, the displacing system comprises a linear axis and a displacement member carrying directly or indirectly the head, and mounted mobile in translation on said linear axis, said machine comprising a cable carrier chain arranged parallel to said linear axis, of which the mobile end is assembled to said displacement member and the fixed end is assembled in a fixed point with respect to said linear axis, said conveying means, in particular said flexible tubes preferably placed in a sheath, passing in said cable carrier chain.

According to an embodiment, the displacing system comprises a poly-articulated arm, for example, of the six-axis robot type.

According to an embodiment, said poly-articulated arm rests in a fixed manner by its base in the safety zone. According to another embodiment, the poly-articulated arm is mounted mobile by its base, for example, via a carriage, on a linear axis resting on the ground.

According to an embodiment, the cable carrier chain is arranged parallel to said linear axis, for example, next to the latter, in a guide channel, and is assembled by its mobile end to the base of the poly-articulated arm, said poly-articulated arm constituting said displacement member.

In another embodiment, the displacing system is a displacing system of the Cartesian coordinate type, a cable carrier chain being provided between a displacement member formed by a carriage, and a fixed linear axis formed for example by two elevated horizontal bars of a gantry, and/or between two carriages, of which one constitutes said displacement member and is mounted mobile in translation on the other carriage, which constitutes said linear axis.

According to an embodiment, the machine further comprises at least one tension limiting system between the application head and the storing means, to exert a traction force on the fibers, and as such limit the take-up tension of the fibers at the application head, the flexible tubes then comprising first segments fixed at the end directly or indirectly to the storing means and to the limiting system, respectively by first joint upstream and downstream fixing means, and second segments fixed at the end to the limiting system and to the fiber application head respectively by second joint upstream and downstream fixing means.

According to an embodiment, in the case of a poly-articulated arm mounted mobile on a rail by its base, for example, via a carriage, said tension limiting system is fixedly mounted on the base or its carriage. In an embodiment, a tension limiting system can be provided at the exit of the creel outside of the protective system.

According to an embodiment, the storing means comprise at least one creel for receiving fiber spools, said machine comprising a joining system, also referred to as a splicing system, able to carry out the joining, for example by gluing, and/or splicing and/or knotting, semi-automatically or automatically, of the final end of a first fiber spool and the starting end of a second fiber spool. The creel can, for example, store on mandrels twice as many spools as the number of fibers draped by the head. During draping, the operator can easily come and load, in ergonomic conditions, a new spool on a mandrel of the creel, and place the starting end of the fiber of this new spool in the joining system, the latter automatically carrying out the junction with the final end of a fiber.

Another embodiment of a fiber application machine, with or without the aforementioned safety system, comprises a fiber application head preferably comprising an application roller and means for guiding fibers onto said application roller, a displacing system to displace said fiber application head, fiber storing means, and fiber conveying means to convey the fibers from said storing means to the application head. The fiber application machine further including a displacing system that comprises a linear axis and a displacement member carrying directly or indirectly the head, and mounted mobile in translation on said linear axis, said machine comprising a cable carrier chain arranged parallel to said linear axis, of which the mobile end is assembled to said displacement member and the fixed end is assembled at a fixed point with respect to said linear axis, said conveying means passing through said cable carrier chain.

The use of such a cable carrier chain, according to an embodiment, makes it possible to place the storing means, formed from a creel or spool cabinet, at a distance from the application head, while still proposing a displacing system which allows for the production of large composite material parts, and while still guaranteeing a good conveyance of the fibers. The operator can as such easily access the creel during draping.

According to an embodiment, said fiber conveying means include flexible tubes, each flexible tube being able to receive a fiber in its internal passage, said flexible tubes, placed in the internal passage of at least one flexible tubular sheath, passing through said cable carrier chain.

According to an embodiment, the displacing system comprises a poly-articulated arm, for example of the six-axis robot type, mounted mobile by its base, for example, via a carriage, on the linear axis resting, for example, on the ground. The cable carrier chain is arranged parallel to said linear axis, for example, next to the latter, in a guide channel, and is assembled by its mobile end to the base of the poly-articulated arm, said poly-articulated arm constituting said displacement member.

According to another embodiment, the displacing system is a displacing system of the Cartesian coordinate type, a cable carrier chain being provided between a displacement member formed by a carriage, and a fixed linear axis formed, for example, by two elevated horizontal bars of a gantry, and/or between two carriages, of which one constitutes said displacement member and is mounted mobile in translation on the other carriage, which constitutes said linear axis.

BRIEF DESCRIPTION OF THE DRAWINGS

The invention will be better understood, and other aims, details, characteristics and advantages will become more apparent from the following detailed explanatory description of embodiments of the invention, with reference to the accompanying schematic drawings wherein.

DETAILED DESCRIPTION OF THE DRAWINGS

Figure 1:
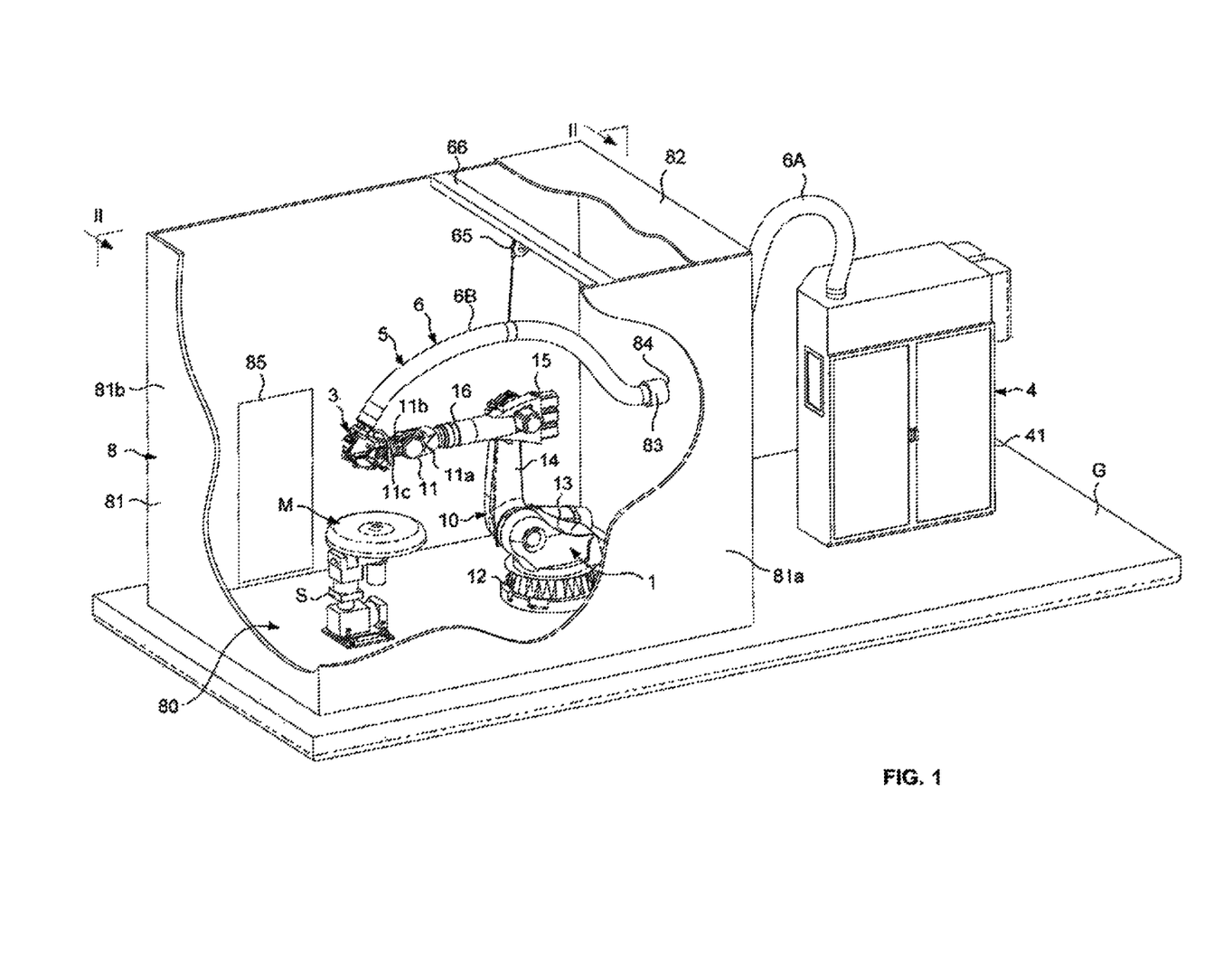
FIG. 1 is a schematic perspective view of a placement machine according to a first embodiment of the invention, wherein the displacing system comprises a standard six-axis robot type poly-articulated arm arranged on the ground.
Figure 2:
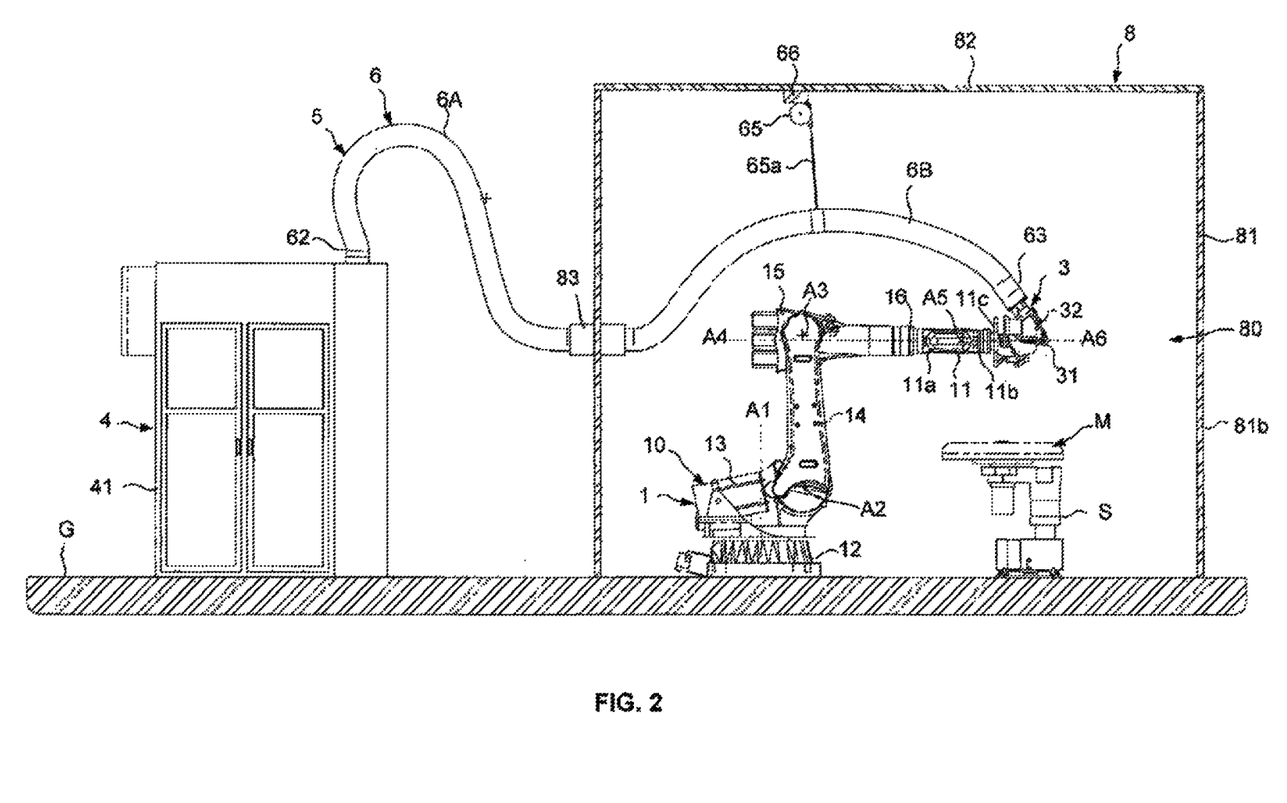
FIG. 2 is a cross-section view according to the cross-section plane II-II of FIG. 1.

FIGS. 1 and 2 show a first embodiment of the invention wherein the placement machine comprises a displacing system 1 formed of a six-axis robot type poly-articulated arm 10, known per se, arranged on the ground G, a fiber application head 3 mounted on the end wrist 11 of the poly-articulated arm 10, storing means 4 to store the fibers F (FIG. 3), conveying means 5 to convey fibers F from said storing means 4 to the fiber application head 3, and a protective enclosure 8.

The poly-articulated arm 10 comprises, in a manner known per se, a first segment or base 12 and a second, third, fourth and fifth segments, respectively 13, 14, 15 and 16, pivotally assembled to each other around rotation axes A1, A2, A3 and A4, and an end wrist 11 comprising the last three segments 11a, 11b, 11c of the poly-articulated arm 10. The end wrist 11 comprises a first segment 11a via which the wrist 11 is assembled to the sixth segment 16 of the poly-articulated arm 10, in such a way that the wrist 11 is rotationally mounted around the axis A4, a second segment 11b pivotally mounted on the first segment 12 around an axis A5, and a third segment 11c pivotally mounted on the second segment 11b around an axis A6, this third segment 11c, or assembling plate, being intended to carry the fiber application head 3. The poly-articulated arm 10 is fixed to the ground G by its base 12.

The fiber application head 3, also referred to as a fiber placement head, comprises in a known manner, a support structure whereon are mounted an application roller 31 able to come into contact with the application surface of a mold M to apply a strip formed of several fibers F, possibly pre-impregnated with resin, and a guiding system making it possible to guide the fibers F toward the roller, for example, in two layers of fibers F. In order to be able to stop and restart the strip application at any time, as well as choose the band width, the fiber application head 3 further comprises cutting and blocking systems so as to individually cut and block each fiber F upstream of the application roller 31, and rerouting systems upstream from the cutting systems to individually reroute each fiber F that has just been cut. The fiber application head 3 further comprises a heating system 32, mounted on the support structure upstream of the application roller 31 in relation to the direction of forward movement of the fiber application head 3 during the application of the strip of fibers F on the application surface of the mold M. The heating system 32 is a heating system 32 of the laser type, of which the radiation is oriented towards the strip, just before it is compacted, as well as towards the strip or strips already deposited. The radiation is as such directed obliquely to the application roller 31 to heat a section of strip arranged on the application roller 31, before it is compacted by the latter. The heating system 32 of the laser type can include laser diodes, arranged in one or several rows, emitting a radiation with a wavelength between 880 to 1030 nm, for example, an optical fiber laser or a YAG laser emitting at a wavelength of about 1060 nm.

Figure 5:
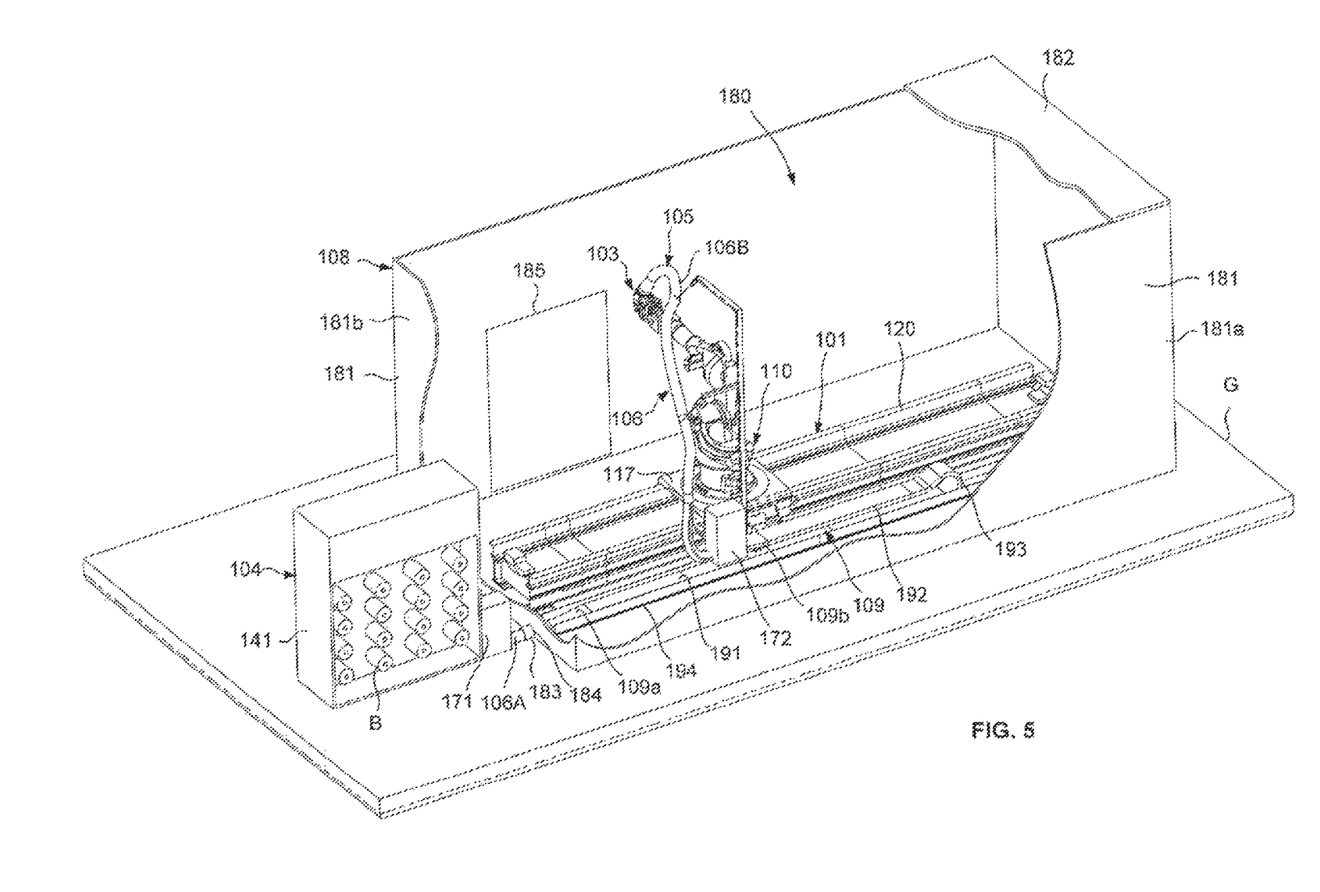
FIG. 5 is a schematic perspective view of a placement machine according to a second embodiment of the invention, wherein the displacing system comprises a standard six-axis robot type poly-articulated arm mounted on a linear axis.

The placement machine is provided for the application of fibers F, for example, of the carbon fiber type, packaged in the form of spools B (FIG. 5). The storing means 4 are formed of a creel 41 for receiving the fiber spools B. The creel 41 comprises a support frame carrying a plurality of mandrels whereon the spools B are mounted. The creel 41 is integrated into a cabinet which will be advantageously regulated for hygrometry and temperature.

The conveying means 5 comprise flexible tubes 5 (FIG. 3) such as described in the aforementioned patent document WO2010/049424, entitled "A Fiber Application Machine Provided with Flexible Fiber Conveying Tubes Arranged Within a Cold Sheath", assigned to the assignees of the present application, and herein incorporated by reference other than the claims or express definitions. The fibers F are individually conveyed from the creel 41 to the fiber application head 3 in the flexible tubes 5 fixed at the ends to the creel 41 and to the fiber application head 3, respectively, by upstream and downstream fixing systems, for example, in the form of ramps. These flexible tubes 5, for example, of rectangular cross-section, and made of plastic material, such as an antistatic high-density polyethylene, have sufficient length and flexibility so as not to limit the displacing system 1 in its movements. Such as described in patent document FR 2 882 681, assigned to the assignees of the present application, and herein incorporated by reference other than the claims or express definitions, each flexible tube 5 can be provided with a longitudinal flexible blade, limiting or prohibiting the transversal bending of the flexible tube 5 within the blade plane, which makes it possible to suppress, or at least limit the risks of turning over of the fiber F arranged in the internal passage of the flexible tube 5, parallel to the blade. Moreover, fluidizing means can be provided to fluidize a fiber F during its transport in the internal passage of a flexible tube. These fluidizing means comprise means for injecting compressed air in the internal passage of each flexible tube 5 in order to create a stream of air in the fiber F transporting direction, and in embodiments, vibration means are included and are able to vibrate said flexible tubes 5.

The flexible tubes 5 are placed in the internal passage of a flexible sheath 6 fixed by its open upstream end 62 to the storing means 4 and by its open downstream end 63 to the fiber application head 3. The flexible sheath 6 is formed from a tubular cover, for example, with a substantially circular transversal cross-section, constituted of a fabric of sealed thermoplastic material, for example, polyurethane reinforced with a metal frame, the metal frame being, for example, constituted of a helical metal wire extending from the upstream end 62 to the downstream end 63 of the flexible sheath 6. Alternatively, the flexible sheath 6 is a robotic corrugated flexible sheath 6, made of polyurethane or polyamide. The sheath 6 is cooled by cooling means, placed in the cabinet of the creel 41, able to inject a cold gas in said internal passage of said sheath 6. The sheath 6 has a sufficient length and flexibility so as not to limit the movements of the poly-articulated arm 10.

According to an embodiment, the placement machine comprises a protective enclosure 8 comprising a lateral wall 81 extending vertically from the ground G, and a horizontal upper wall 82 forming a ceiling. In the embodiment shown, the enclosure 8 has a general parallelepiped shape, the lateral wall 81 comprising two opposite parallel longitudinal portions 81a connected together by two opposite parallel transversal portions 81b. In an embodiment, the walls 81, 82 can be, for example, formed from a metal framework whereon are mounted opaque panels, for example, wood or wood particle board panels, in particular melamine panels, or metal panels, in particular insulation panels, for example, each formed of two steel plates, and, in an embodiment painted, between which is placed an insulating material such as polyurethane foam. In another embodiment, the lateral wall 81 extends to the ceiling of the building wherein the placement machine is placed, the ceiling of the protective enclosure 8 being formed by the ceiling of the building. In another embodiment, the placement machine can be placed in the vicinity of a wall of a building wherein the placement machine is placed, the lateral wall 81 of the protective enclosure 8 being formed partially by a portion of said wall of the building.

The protective enclosure 8 defines a protective zone 80 wherein are placed the poly-articulated arm 10 carrying the head 3, and the mold M to be draped. The walls 81, 82 of the protective enclosure 8 form a screen to the radiation emitted by the laser heating system 32 of the fiber application head 3. The lateral wall 81 is provided with a door 85 making it possible to access the protective zone 80 for installing and removing molds M, and for carrying out operations on the fiber application head 3. The creel 41 is arranged outside of the protective enclosure 8, in the vicinity of the latter. The sheath 6 wherein the flexible tubes 5 are placed passes through the lateral wall 81 by passing through an opening 84 of the lateral wall 81, for example, substantially at mid-height of the lateral wall 81. The sheath 6 passes, for example, through a cylindrical sleeve 83 passing in a tight manner through the lateral wall 81, the sheath 6 passing in a tight manner through said cylindrical sleeve 83. The sheath 6 as such has an upstream portion 6A outside of the protective enclosure 8 and a downstream portion 6B arranged in the protective enclosure 8. The light tightness at flexible tubes 5 can be guaranteed by the length and the geometry of the flexible tubes 5.

To prevent the sheath 6 from hindering the displacements of the fiber application head 3 and/or from coming against the mold M, the placement machine comprises a slack recovery system, also called tensioning system, acting on said sheath 6 in such a way that the downstream portion 6B of the sheath 6 remains taut, in particular at the level of the end wrist 11. Said slack recovery system comprises an automatic cable winder 65, for example of the spiral spring type, mounted on a support traverse 66 fixed in the upper portion of the protective enclosure 8, and of which the free end of the cable 65a is fixed to the sheath 6.

In another embodiment, the upstream portion 6A of the sheath 6 is formed by a first upstream sheath segment fixed by a first end to the creel 41 and by a second end to said cylindrical sleeve 83 passing through the lateral wall 81. The downstream portion 6B of the sheath is formed of a second sheath segment fixed by a first end to said cylindrical sleeve 83, on the interior side of the protective enclosure 8, and by a second end to the fiber application head 3.

Each flexible tube 5 is formed of a single segment extending from the creel 41 to the fiber application head 3. In another embodiment, the fibers F pass through first segments of flexible tube 5A, referred to as the first tubes, fixed by their ends to the creel 41 and to a fixing system mounted on the lateral wall 81 of the protective enclosure 8, for example, in the cylindrical sleeve 83, and in second segments of flexible tube 5B, referred to as second tubes, fixed by their ends to said fixing system of the lateral wall 81 and to the fiber application head 3. This fixing system is formed of one or several ramps, for example, of two superposed ramps, one for each layer of fibers F.

Figure 3:
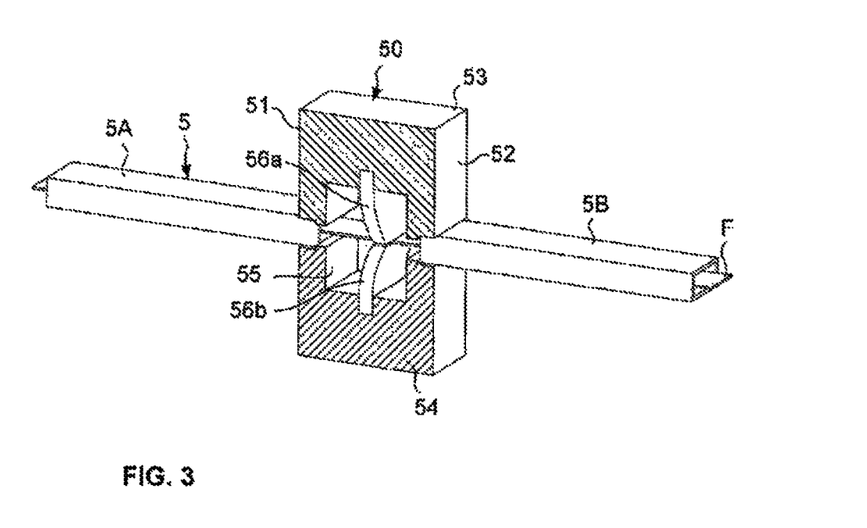
FIG. 3 is a partial schematic view in perspective of a system for fixing flexible tubes at a wall of the enclosure with a tightness system according to a first embodiment.

FIG. 3 shows a partial perspective view of a ramp 50 of this fixing system of the lateral wall 81 of the protective enclosure 8. Each first tube 5A, of rectangular cross-section, is fixed by an end in a slot of the front surface 51 of the ramp 50, a second tube 5B of rectangular cross-section being fixed by an end in a slot of the rear surface 52 of the ramp 50, across from a first tube 5A. The ramp 50 is formed of two plates, referred to as the upper plate 53 and lower plate 54, assembled to one another to wedge between them the first tubes 5A and the second tubes 5B substantially edge-to-edge, in one row on each side.

According to the length of the first 5A and second 5B tubes, and in order to guarantee a perfect light tightness at the conveyance of the fibers F, the wall is advantageously provided with a tightness system. In reference to FIG. 3, this tightness system is mounted in a longitudinal housing 55 of the ramp 50, formed in the two plates 53, 54, between the first tubes 5A and the second tubes 5B. For each fiber F, the tightness system is formed of a pair of brushes 56a, 56b between which pass the fiber F, in such a way that any possible light ray coming from the second tube 5B be stopped by the brushes 56a, 56b. An upper brush 56a is mounted on the upper plate 53 and a lower brush 56b is mounted on the lower plate 54. Each brush 56a, 56b is formed of a single tab or of several threads. An upper brush 56a and a lower brush 56b are provided for each fiber F. In another embodiment, the ramp 50 is provided with an upper brush 56a and a lower brush 56b for all of the fibers of the ramp.

Figure 4:
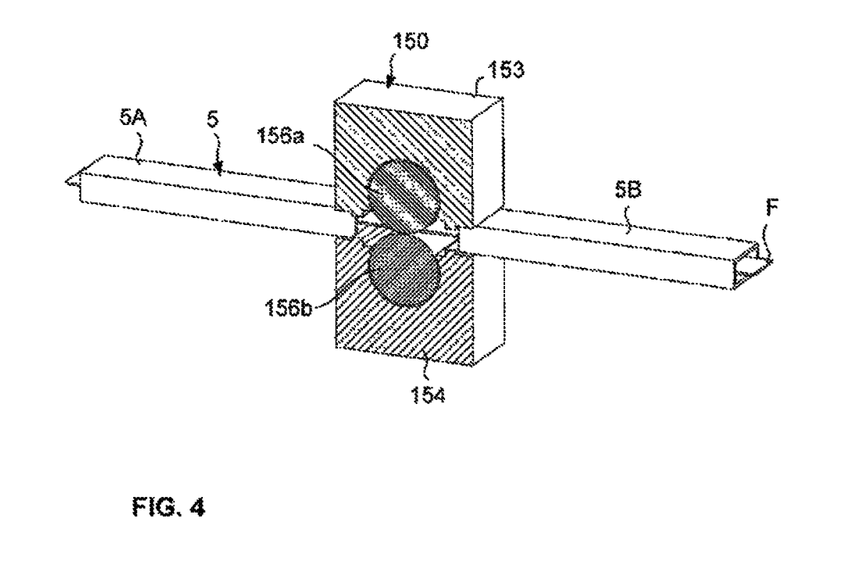
FIG. 4 is a view similar to that of FIG. 3, the system for fixing flexible tubes being provided with a tightness system according to a second embodiment.

FIG. 4 shows an embodiment wherein the tightness system is formed of two rollers 156a, 156b between which pass the fibers F. An upper roller 156a is rotationally mounted on the upper plate 153 of the ramp 150 and a lower roller 156b is mounted on the lower plate 154 of the ramp 150.

The placement machine comprises a control unit (not shown) placed outside of the protective enclosure 8, comprising a human-machine interface to control the displacements of the robot according to programmed sequences, the fiber application head 3, in particular the jacks of individual cutting systems and of rerouting systems. The electrical cables and pneumatic and/or hydraulic lines for the supply and the control of the placement head are arranged in one or several pipes (not shown) extending from the fiber application head 3, along the arm 10 of the robot to the control unit, by passing in a substantially tight manner through the lateral wall 81. These pipes pass, for example, through an opening (not shown) arranged in the bottom portion of the lateral wall 81.

The placement machine comprises a support S (FIGS. 1 and 2) arranged inside the protective enclosure 8 for the support of a mold M, with this support S possibly allowing for a displacement in translation of the mold M in one or several directions and/or a displacement in rotation around one or several axes of rotation A1, A2, A3 and A4.

FIGS. 5 to 9 depict a second embodiment wherein the placement machine comprises a displacing system 101 formed from a six-axis robot type poly-articulated arm 110, such as described previously, mounted mobile on a linear axis 120. As described previously, the fiber placement head 103 comprises in particular an application roller, a guiding system and a heating system of the laser type, and is mounted on the end wrist 111 of the poly-articulated arm 110. The poly-articulated arm 110 is fixed by its base 112 on a carriage 117 slidingly mounted on the linear axis 120, said linear axis 120 being comprised of two parallel rails 121 fixed to the ground G. The carriage 117 is provided with driving means, for example, of the motorized roller type, servo-controlled by a control unit for the displacement of the fiber placement head 103 along these rails 121. The storing means 104 are formed of a creel 141 for receiving the fiber spools B. The creel 141 comprises a support frame carrying a plurality of mandrels whereon the fiber spools B are mounted. The creel 141 is integrated into a cabinet advantageously regulated for hygrometry and temperature. The conveying means 105 comprise flexible tubes 5 fixed at the ends to the creel 141 and to the fiber placement head 103. The tubes 5 are placed in the internal passage of a sheath 106 fixed at the end to the creel 141 and to the fiber placement head 103, and cooled by cooling means, placed in the cabinet of the creel 141.

The placement machine comprises a protective enclosure 108 forming a screen to the laser beam, comprising a lateral wall 181 extending vertically from the ground G, and an upper horizontal wall 182 forming a ceiling. The lateral wall 181 comprises two longitudinal portions 181a, of which one is provided with a door 185 and two transversal portions 181b. The enclosure surrounds the poly-articulated arm 110 carrying the fiber placement head 103, as well as the linear axis 120 whereon the poly-articulated arm 110 is mounted.

Figure 6:
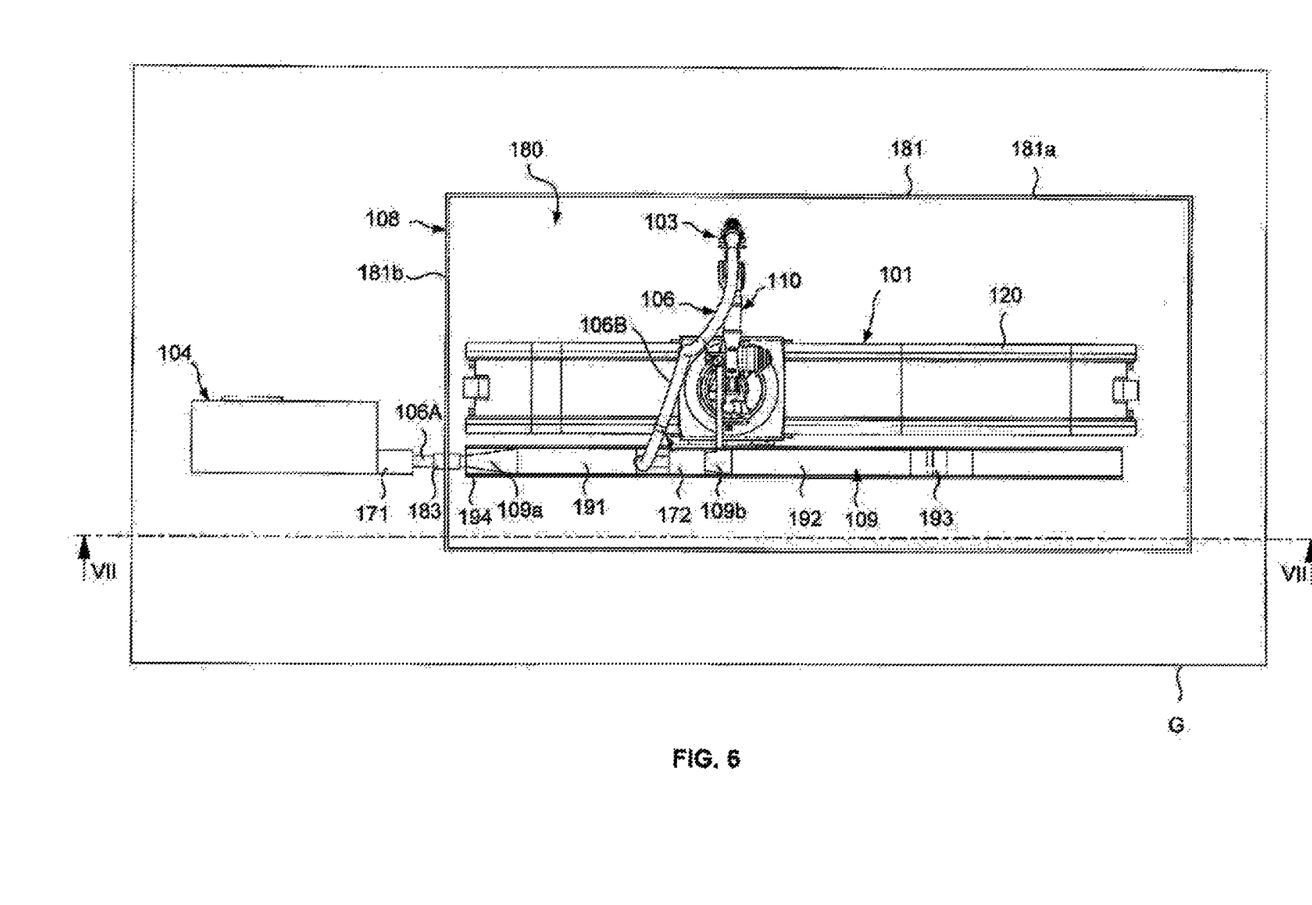
FIG. 6 is a schematic top view of the machine of FIG. 5, in the absence of the ceiling of the enclosure.
Figure 7:
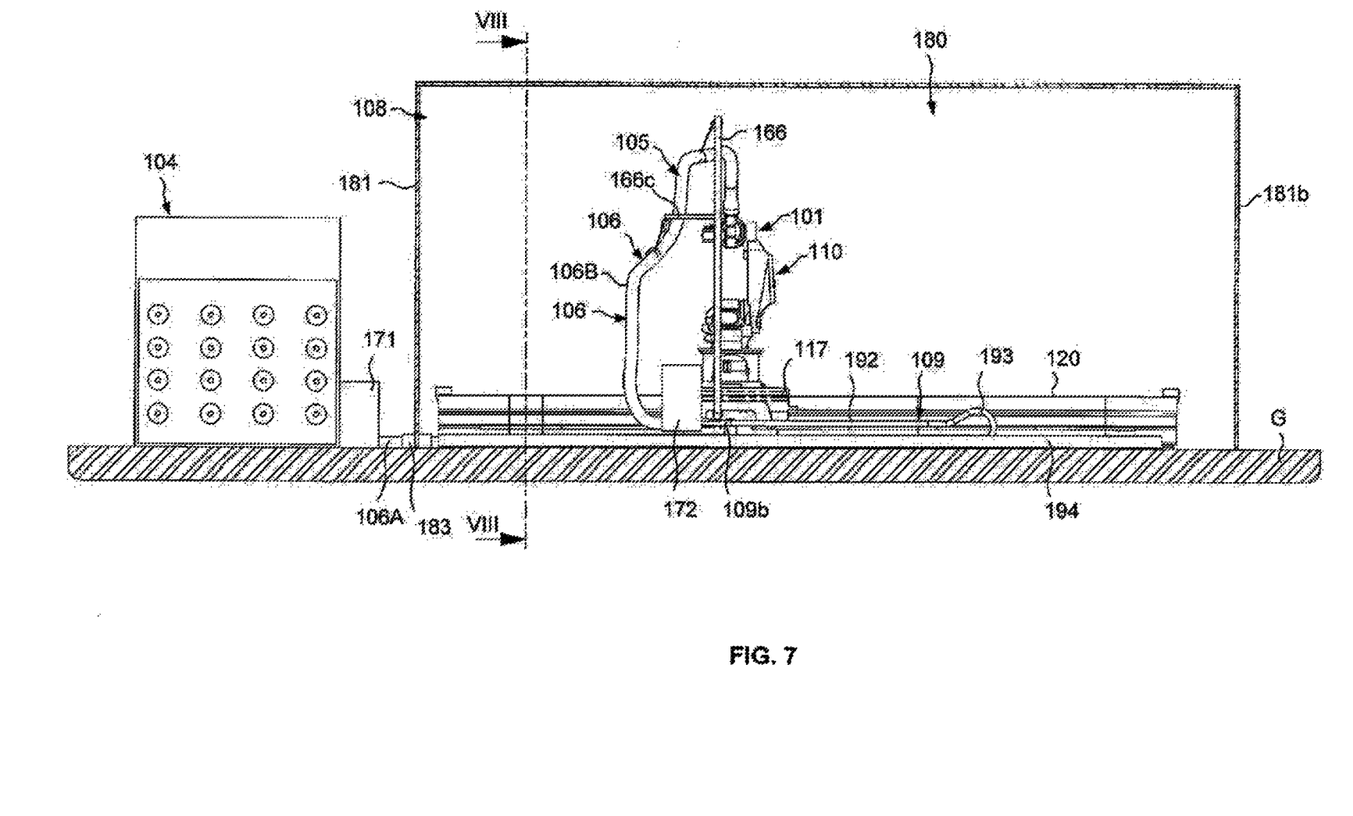
FIG. 7 is a schematic longitudinal cross-section view according to the cross-section plane VII-VII of FIG. 6.

The creel 141 is arranged outside of the protective zone 180 defined by the protective enclosure 108, in the vicinity of the latter. The sheath 106 wherein the flexible tubes 5 are placed passes through an opening 184 of the lateral wall 181, arranged in the lower portion of the lateral wall 181 and provided with a sleeve 183.

One or several tension limiting systems, such as described in detail in the aforementioned patent document WO2006/092514, comprising a set of motorized parallel cylinders on which the fibers F pass without going around it, can be provided between the creel 141 and the fiber placement head 103 to reduce the tension of the fibers F at the roller. In this embodiment, a first tension limiting system 171 is integrated into the cabinet of the creel 141, or arranged at the exit of the cabinet, in the lower portion of the cabinet.

The flexible tubes 5 placed in the sheath 106 are fixed to an upstream fixing system placed at the exit of the first tension limiting system 171. The sheath 106 passes through the sleeve 183 arranged in the lower portion of the transversal wall 181b. In the protective enclosure 108, at the exit of the sleeve 183, the sheath 106 is placed in a cable carrier chain 109, arranged along the linear axis 120. The cable carrier chain 109, known per se, is formed from a set of hollow links articulated to one other, wherein the sheath 106 is housed, and comprises an end 109a, referred to as fixed end, assembled here to the sleeve 183 and an end 109b, referred to as mobile end, assembled here to a lateral support 117a (FIG. 8) assembled to the mobile carriage 117. In this embodiment, the articulation axes of the links are arranged horizontally. The cable carrier chain 109 comprises a first strand 191, referred to as lower strand, of variable length comprising the fixed end 109a, this lower strand 191 is connected by a bend portion 193, substantially in the shape of a U lying down, to a second strand 192, referred to as upper strand, of variable length, comprising the mobile end 109b. The cable carrier chain 109 is arranged in a guide channel 194 placed on the ground G, parallel to the linear axis 120. The lower strand 191 rests on the bottom of the guide channel 194, with the upper strand 192 being arranged on the lower strand 191.

Figure 8:
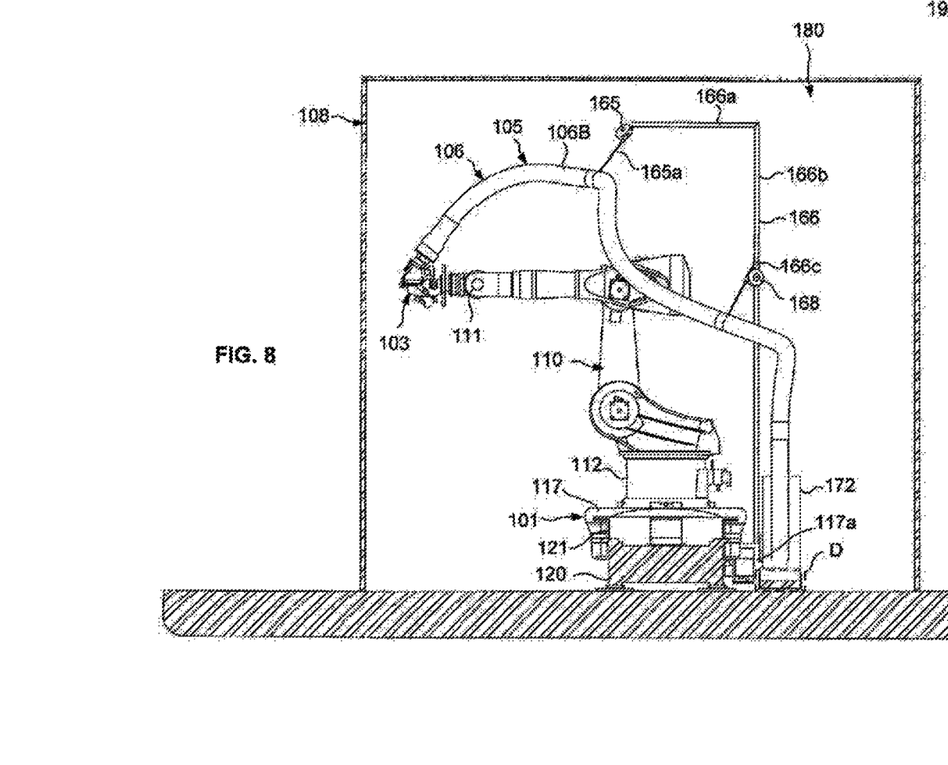
FIG. 8 is a schematic transversal cross-section view according to the cross-section plane VIII-VIII of FIG. 7; and, FIG. 9 is an enlarged view of the detail D of FIG. 8.
Figure 9:
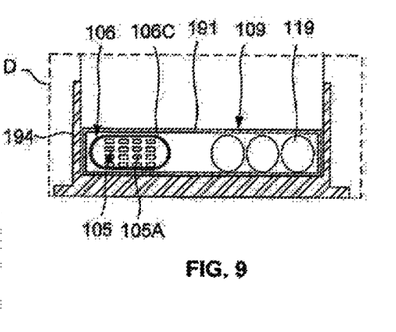

In the embodiment shown, the upper strand 192 is fixed at an end to a second tension limiting system 172 mounted on the lateral support 117a assembled to the carriage 117. At the exit of the first tension limiter 171, the fibers pass through the first segments of flexible tube 5A, referred to as first tubes, fixed by their end to the first tension limiter 171 and to the second tension limiter 172 via fixing systems. At the exit of the second tension limiter 172, the fibers pass through second segments of flexible tube 5B, referred to as second tubes, fixed by their ends to said second limiting system 172 and to the fiber placement head 103. The sheath 106 has an upstream portion 106A outside of the protective enclosure 108, an intermediate portion 106C arranged in the protective enclosure 108in the cable carrier chain 109 and a downstream portion 106B arranged in the protective enclosure 108 between the second limiting system 172 and the fiber placement head 103. FIG. 9 shows the lower strand 191 of the cable carrier chain 109 placed in the channel 194, and wherein the intermediate portion 106C of the sheath 106 passes, the first tube segments 105A being arranged in the internal passage of this intermediate sheath portion 106C.

The upstream portion 106A and the intermediate portion 106C of the sheath 106 can be formed from the same section of sheath 106, or from two separate segments of sheath 106, of which a first upstream segment of sheath 106A fixed between the first tension limiting system 171 and the sleeve 183, and a second segment of sheath 106C fixed between the sleeve 183 and the second tension limiting system 172. The downstream portion 106B of the sheath 106 is formed of a segment of separated sheath fixed between the second tension limiter 172 and the fiber placement head 103.

The light tightness on the flexible tubes 5 can be guaranteed by the length and the geometry of the flexible tubes.

To prevent the downstream portion 106B of the sheath 106 from hindering the displacements of the fiber placement head 103 and/or from coming against the mold M, the placement machine comprises a slack recovery system, acting on the downstream portion 106B of said sheath 106 in such a way that it remains taut in particular at the level of the end wrist 111 of the robot. In reference to FIG. 8, said slack recovery system comprises a first automatic cable winder 165, mounted on the upper horizontal bar 166a of a beam 166, and of which the free end of the cable 165a is fixed to the sheath 106. The beam 166 is fixed by its riser 166b on the lateral support 117a, the upper horizontal bar 166a extending perpendicularly to the linear axis 120, above the poly-articulated arm 110. A second automatic winder 168 is, for example, mounted on an intermediary horizontal bar 166c of the beam 166 which is arranged under the upper horizontal bar 166a, perpendicularly to the linear axis 120 and of which the free end of the cable is fixed to the sheath 106.

In the embodiment as shown in FIG. 9, the electrical cables and/or the pneumatic and/or hydraulic lines for the supply and controlling of the fiber placement head 103 and of the poly-articulated arm 110 pass through the cable carrier chain 109, said cables and lines are grouped together into one or several pipes, shown diagrammatically as reference 119. At the fixed end of the cable carrier chain 109, the cables and/or lines 119 pass in a substantially tight manner through the wall of the protective enclosure 108, for example, by passing through the same sleeve 183 as the flexible tubes, for their connection to the control unit. At the mobile end of the cable carrier chain 109, the cables and/or lines 119 exit laterally from the cable carrier chain 109, before the second tension limiting system 172, and a portion of them extends along the poly-articulated arm 110 in pipes (not shown) to the fiber placement head 103 for the supply and the controlling of the fiber placement head 103.

According to another embodiment, the fiber placement head 103 is mounted on a displacing system of the Cartesian coordinate type, in particular of the gantry type, with an end wrist 111, comprising, for example, such as described in patent document WO2010/049424, a first carriage mounted mobile according to a first horizontal direction between two elevated parallel support bars of a gantry, a second carriage mounted mobile on the first carriage according to a second horizontal direction perpendicular to the first, and a third carriage, also called a sliding carriage, mounted mobile vertically on the second carriage according to a third vertical direction. The wrist 111, of the three-axis robot wrist type, is pivotingly mounted at the lower end of the third carriage around a vertical axis of rotation. The displacing system is placed in an protective enclosure 108, and the creel 141 is arranged outside of the protective enclosure 108. The flexible tubes for the conveyance of the fibers from the creel 141 to the fiber placement head 103, possibly placed in a flexible sheath 106, pass through a first cable carrier chain arranged horizontally along an elevated support bar of the gantry, the fixed end of the chain being fixed to said bar, its mobile end being fixed to the first carriage. The flexible tubes then pass through a second cable carrier chain arranged horizontally along the first carriage, the fixed end of the chain being fixed to said first carriage, and its mobile end being fixed to the second carriage.

Although the invention has been described in relation with various particular embodiments, it is to be understood that it is in no way limited thereto and that it comprises all the technical equivalents of the means described as well as their combinations should these fall within the scope of the invention.

The invention claimed is:

1. Fiber application machine comprising:
a fiber application head further comprising an application roller and means for guiding fibers on said application roller,
a displacing system to displace said fiber application head,
fiber storing means,
fiber conveying means to convey the fibers from said storing means to the application head, and
a safety system comprising at least one perimeter barrier, formed from a lateral wall defining a safety zone wherein the displacing system carrying the application head is placed, the fiber storing means being arranged outside of said safety zone,
said safety system forming a protective enclosure, including said lateral wall and an upper wall,
said fiber application head comprising a heating system of the laser type, said protective enclosure forming a screen to the radiation emitted by the heating system,
said fibers are conveyed from the storing means to the application head through the protective enclosure in an opening in the lateral wall or the upper wall defining a light insulating structure resiliently surrounding the fiber, wherein the fiber passes through the light insulating structure in a substantially light radiation-tight manner.

2. A fiber application machine according to claim 1, wherein the storing means rest in a fixed manner on the ground, during draping operations, said storing means comprising at least one creel for receiving fiber spools.

3. A fiber application machine according to claim 1, wherein said fiber conveying means include flexible tubes, each flexible tube having an internal passage and being able to receive a fiber in the internal passage.

4. A fiber application machine according to claim 3, wherein each flexible tube comprises at least one segment of flexible tube extending in the safety zone and connected at the level of the safety system to a fixing system.

5. A fiber application machine according to claim 4, wherein said fixing system is provided with a tightness system, guaranteeing a tightness between the internal passages of said tube segments and the outside of the safety system.

6. A fiber application machine according to claim 1, wherein the fiber conveying means are placed in the internal passage of at least one flexible tubular sheath.

7. A fiber application machine according to claim 1, wherein the displacing system comprises a poly-articulated arm.

8. A fiber application machine according to claim 7, wherein the poly-articulated arm is mounted mobile by its base on a linear axis.

9. A fiber application machine according to claim 1, wherein at least one tension limiting system is between the application head and the storing means, to exert a traction force on the fibers.

10. A fiber application machine according to claim 1, wherein the storing means comprise at least one creel for receiving fiber spools, said machine comprising a joining system able to carry out the junction of the final end of a first fiber spool and the starting end of a second fiber spool.

11. A fiber application machine according to claim 8, wherein the cable carrier chain is arranged parallel to said linear axis, and is assembled by its mobile end to the base of the poly-articulated arm.

12. A fiber application machine according to claim 9, wherein it further comprises a safety system comprising at least one perimeter barrier, defining a safety zone wherein the displacing system carrying the application head is placed, the storing means being arranged outside of said safety zone.

13. A fiber application machine according to claim 9, wherein the storing means rests in a fixed manner on the ground, during draping operations, said storing means comprises at least one creel for receiving fiber spools.

14. A fiber application machine according to claim 5, wherein the tightness system includes a pair of brushes through which the fiber passes, the pair of brushes configured to inhibit the passage of light radiation therethrough.

15. A fiber application machine according to claim 5, wherein the tightness system includes two rollers through which the fiber passes, the pair of rollers configured to inhibit the passage of light radiation therethrough.

* * * * *